D. H. Colburn.
Axe

No. 3083.

Reissued Aug. 18. 1868.

Witnesses;
Thos Tusche
J A Serwee

Inventor;
D H Colburn
Per Munn & Co
Attorneys

UNITED STATES PATENT OFFICE.

THOMAS BAKEWELL AND JOHN LIPPINCOTT, OF PITTSBURG, PENNSYLVANIA, ASSIGNEES OF DANIEL W. COLBURN, OF LAOMI, ILLINOIS.

IMPROVEMENT IN AXES.

Specification forming part of Letters Patent No. 66,563, dated July 9, 1867; Reissue No. 3,083, dated August 18, 1868.

*To all whom it may concern:*

Be it known that DANIEL W. COLBURN, of Laomi, in the county of Sangamon and State of Illinois, assignor to JOHN LIPPINCOTT and THOMAS BAKEWELL, of the city of Pittsburg, in the county of Allegheny and State of Pennsylvania, has invented a new and useful Improvement in Axes of the description known as Felling or Chopping Axes; and we, the said assignees, do hereby declare the following to be a full, clear, and exact description thereof, reference being had to the accompanying drawings, making a part of this specification, in which—

Figure 1:
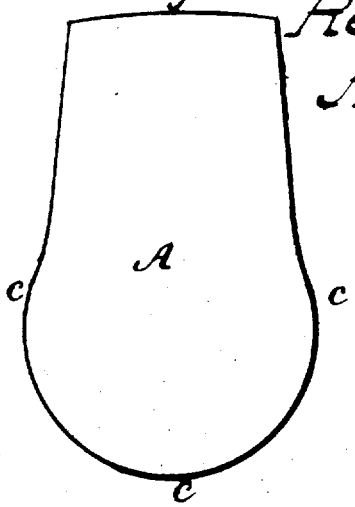
Figure 2:
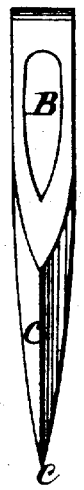

Figure 1 is a side view, and Fig. 2 is an end view, of an ax constructed after the improvement of the said DANIEL W. COLBURN.

Like letters of reference indicate like parts.

This invention relates to an improved form of ax; and the nature of it consists, first, in making the edge of the ax, forward of the broadest part of the bit, of a semicircular shape; second, in continuing such cutting-edge around and back of the swell of the bit on both ends of the ax, such edges being drawn in somewhat as they approach the eye of the axe-poll; and, third, making an ax with a poll of gradually-increasing width from the eye toward the bit, when combined with a bit having a curved cutting-edge extending around and back of its broadest part, on both ends of the poll, so that the poll may be reversible, and that the handle may be inserted at either end of the eye.

To enable others skilled in the art to make and use this improvement, we will proceed to describe the same and its manner of use.

In manufacturing, we adopt any known or convenient mode.

*a* is the poll of the ax. *b* is the eye or hole for the handle, and *c* is the blade or bit. This blade or bit we make of such shape that so much of the edge *e* as is forward of a line as *x x*, Fig. 1, passing through its broadest part, will be semicircular, or so nearly so as to secure substantially the same advantages. Such cutting-edge is extended around on either end of the ax, back of the swell of the bit, as at *e′ e′*. Such edges *e′ e′* recede somewhat, and we usually so make them that they shall have a common radius of curvature with the forward part *e* of the bit. The two ends *d d* of the ax, are similar in shape, so that the ax-handle may be inserted from either end.

In manufacturing, we usually make the ax of such shape that at all points at equal distances from the edge in lines drawn at right angles to tangential lines, as along the dotted line *s s*, the ax will have a uniform thickness.

The effect of the semicircular edge is to convert each stroke of the ax into a drawing and slicing cut, and for that purpose we do not limit the invention to an exact semicircular edge, but include such modifications of a semicircular edge as will secure substantially the same results. As the edge continues around and back of the swell or broad part of the bit, the ax, in being loosened, after it is deeply embedded in the wood, has a tendency to cut its way out, though in consequence of the semicircular shape of the edge little or no resistane will be experienced in removing the ax from the wood, excepting such as may be caused by the sliding friction. Also, the amount of resistance to the ax in penetrating wood will be less than with the ordinary ax, since the ax at the broadest part, near the extremities of the cutting-edge, is drawn out thin.

By making both ends of the ax of like shape and symmetrical the ax is more easily hung.

What we claim as the invention of the said DANIEL W. COLBURN, and desire to secure by Letters Patent, is—

1. Making that part of the edge of an ax which lies forward of the broadest part of the bit of a semicircular shape, or of a shape nearly semicircular, substantially as and for the purposes hereinbefore set forth.

2. Continuing the cutting-edge of an ax around the swell of the bit on both ends of the ax, substantially as and for the purposes above set forth.

3. Making an ax with a poll of gradually-increasing width from the eye towards the bit, when combined with a bit having a curved cutting-edge extending around and back of its broadest part on both ends of the poll, so that the poll may be reversible, and that the handle may be inserted at either end of the eye.

In testimony whereof, we, the said THOMAS BAKEWELL and JOHN LIPPINCOTT, have hereunto set our hands.

THOS. BAKEWELL.
JOHN LIPPINCOTT.

Witnesses:
G. H. CHRISTY,
ELL TORRANCE.